United States Patent
Clouet et al.

(10) Patent No.: US 6,538,199 B2
(45) Date of Patent: Mar. 25, 2003

(54) CONTROL BOX FOR AN ELEVATOR

(75) Inventors: Christophe Clouet, Le Mee s/ Seine (FR); William Aubry, Melun (FR)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/013,736

(22) Filed: Dec. 13, 2001

(65) Prior Publication Data

US 2002/0079112 A1 Jun. 27, 2002

(30) Foreign Application Priority Data

Dec. 22, 2000  (EP) ............................................. 00811234

(51) Int. Cl.⁷ ................................................. H02G 3/08
(52) U.S. Cl. ............................. 174/50; 174/48; 174/58; 220/3.2; 220/4.02
(58) Field of Search ............................... 174/50, 53, 58, 174/48, 17 R, 65 G, 65 R; 220/3.2, 3.3, 3.8, 241, 4.02

(56) References Cited

U.S. PATENT DOCUMENTS

| | | | | |
|---|---|---|---|---|
| 3,607,604 A | * | 9/1971 | Nava ........................ | 174/65 R |
| 4,057,164 A | * | 11/1977 | Maier ........................... | 174/57 |
| 4,419,535 A | * | 12/1983 | O'Hara ........................ | 169/48 |
| 5,216,203 A | * | 6/1993 | Gower .................... | 174/152 G |
| 5,408,740 A | * | 4/1995 | Dee ........................ | 174/152 R |
| 5,939,676 A | * | 8/1999 | Birmingham et al. ..... | 174/65 R |
| 6,291,767 B1 | * | 9/2001 | Beecher et al. ............... | 174/50 |

FOREIGN PATENT DOCUMENTS

| | | |
|---|---|---|
| EP | 0 680 921 | 11/1995 |
| WO | WO 89/05533 | 10/1981 |
| WO | WO 81/02813 | 6/1989 |

* cited by examiner

Primary Examiner—Anthony Dinkins
Assistant Examiner—Angel R. Estrada
(74) Attorney, Agent, or Firm—MacMillan, Sobanski & Todd, LLC

(57) ABSTRACT

An elevator control box is constructed to avoid propagating a cable fire in the control box into the elevator shaft. The control box is incorporated in a wall of the elevator shaft and has an opening through which a cable is guided. A fireproof element is positioned in the control box surrounding the cable in the region of the opening.

20 Claims, 5 Drawing Sheets

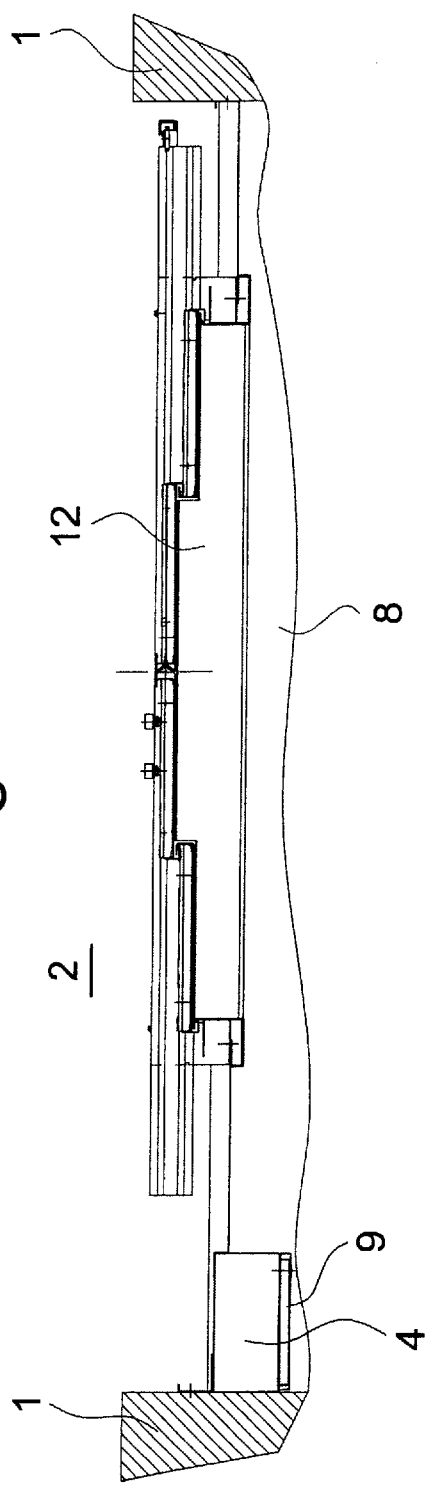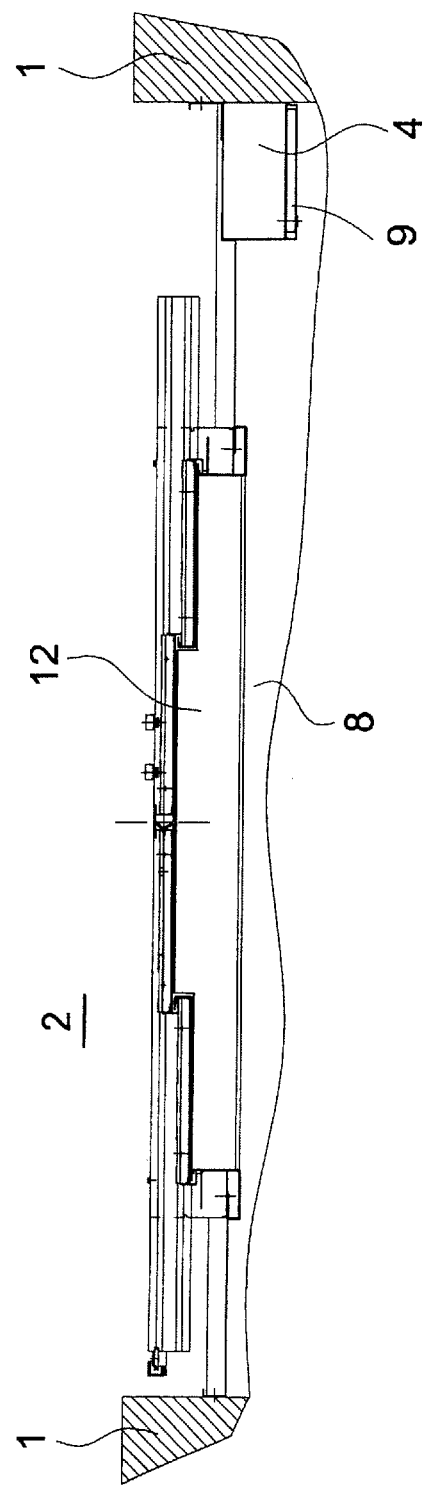

D-D

CONTROL BOX FOR AN ELEVATOR

BACKGROUND OF THE INVENTION

The present invention relates generally to a control box for an elevator.

The European patent document EP 0 680 921 B1 shows a control box for an elevator that is installed in a wall of the elevator shaft at the floor. A fireproof door is in fact provided at the control box and protects the electrical subassemblies of the control box against fire on the floor and the floor against fire in the control box, but in the case of fire in the control box the fire is not prevented from propagating into the shaft in which the elevator car moves. Thus, it is not guaranteed that in the case of fire in the control box the persons located in the shaft or in the car are sufficiently protected. This form of embodiment therefore does not fulfil the technical safety requirements to the full extent.

SUMMARY OF THE INVENTION

It is therefore an object of the present invention to provide a control box for an elevator in which it is ensured with sufficient certainty that a fire in the control box, especially a cable fire, cannot propagate into the shaft space.

The present invention concerns a control box for an elevator, which is provided in a wall of an elevator shaft, has an opening through which a cable is guided. In addition, the control box includes a fireproof element that surrounds the cable in the region of the opening.

It is of particular advantage to provide the opening in the lower region of the control box, because the fire propagation can thereby be further reduced. It also is of advantage to construct the fireproof element from ceramic fiber, rock wool, glass wool, a silicate compound or gypsum. A sufficient fire protection insulation is thereby guaranteed. In order to further increase the fire protection insulation, the cable can be advantageously tightly enclosed by the fireproof element.

In addition, it is of advantage to provide two clamping elements and a clamping device, wherein the fireproof element is clamped in place between the two clamping elements by means of the clamping device. The fireproof element thereby tightly surrounds the cable, whereby a high fire protective isolation is achieved. The clamping device can advantageously comprise a screw and a nut.

It is of advantage if the control box includes a foot, wherein the screw as a component of the clamping device can additionally serve as the foot. The control box can advantageously stand on the floor in a recess. The cable can be an electrical cable or a cable for actuation of a brake.

Finally, it can also be of advantage to provide the opening in the upper region of the control box. The cable guidance into the shaft is thereby optimized.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a fragmentary top plan view of a first possible arrangement of the control box shown in FIG. 1 in the region of a floor;

FIG. 3 is a fragmentary top plan view of a second possible arrangement of the control box shown in FIG. 1 in the region of a floor;

DESCRIPTION OF THE PREFERRED EMBODIMENT

Figure 1:
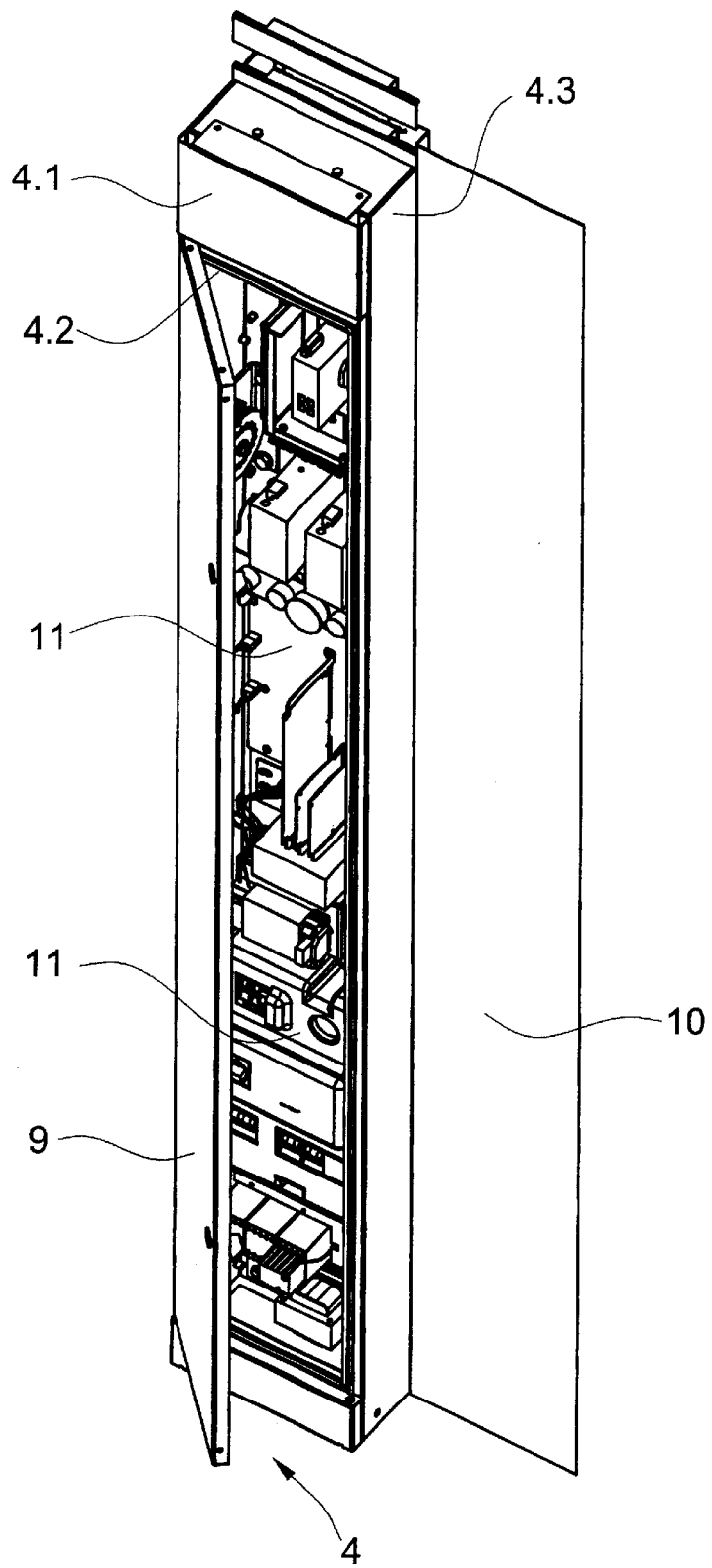
FIG. 1 is a perspective view of a control box according to the present invention equipped with electronic subassemblies.

An elevator control box 4 according to the present invention is shown in FIG. 1 as including a hollow box or housing having a front wall 4.1 with an opening 4.2 formed therein. Service personnel can gain access to electronic components or subassemblies 11 in a hollow interior of the control box 4 by way of a door 9 hinged to the box to selectively close the opening 4.2. As a rule, the door 9 is mounted to open along an edge of the opening 4.2 towards the adjacent floor (FIGS. 2 and 3) so that the electronic components 11 are readily accessible from the floor. The control box 4 can be connected with the frame of the shaft door by means of, for example, a connecting plate 10 extending outwardly from a side wall 4.3 of the box.

In a top plan view FIG. 2, the control box 4 is shown mounted on the left hand side of a shaft door 12 as viewed from a floor 8. The control box 4 is disposed on the floor 8 and separates an elevator shaft 2 from the floor. The electrical and electronic subassemblies are accessible from the floor 8 by way of the door 9. The control box 4 is attached at one side with a shaft wall 1 and on the other side with a frame of the shaft door 12. The control box 4 is in that case arranged in such a manner that the opening in the shaft wall 1 in which the control box and the shaft door 12 are positioned has minimal dimensions. The shaft wall opening in that case merely has to be selected to be of such width that the shaft door 12 can open unhindered. The control box 4 is placed in the shaft wall opening in such a manner that the shaft door 12 is disposed in the opened state behind the control box.

In FIG. 2, the shaft door 12 is shown as a centrally opening four-panel telescopic door. However, the control box 4 is in principle also usable with other types of shaft doors.

In the case of the embodiment shown in FIG. 3, it is substantially the same as the embodiment shown in FIG. 2. The only difference is that merely the control box 4 is arranged on the other side of the opening in the shaft wall 1.

Figure 4:
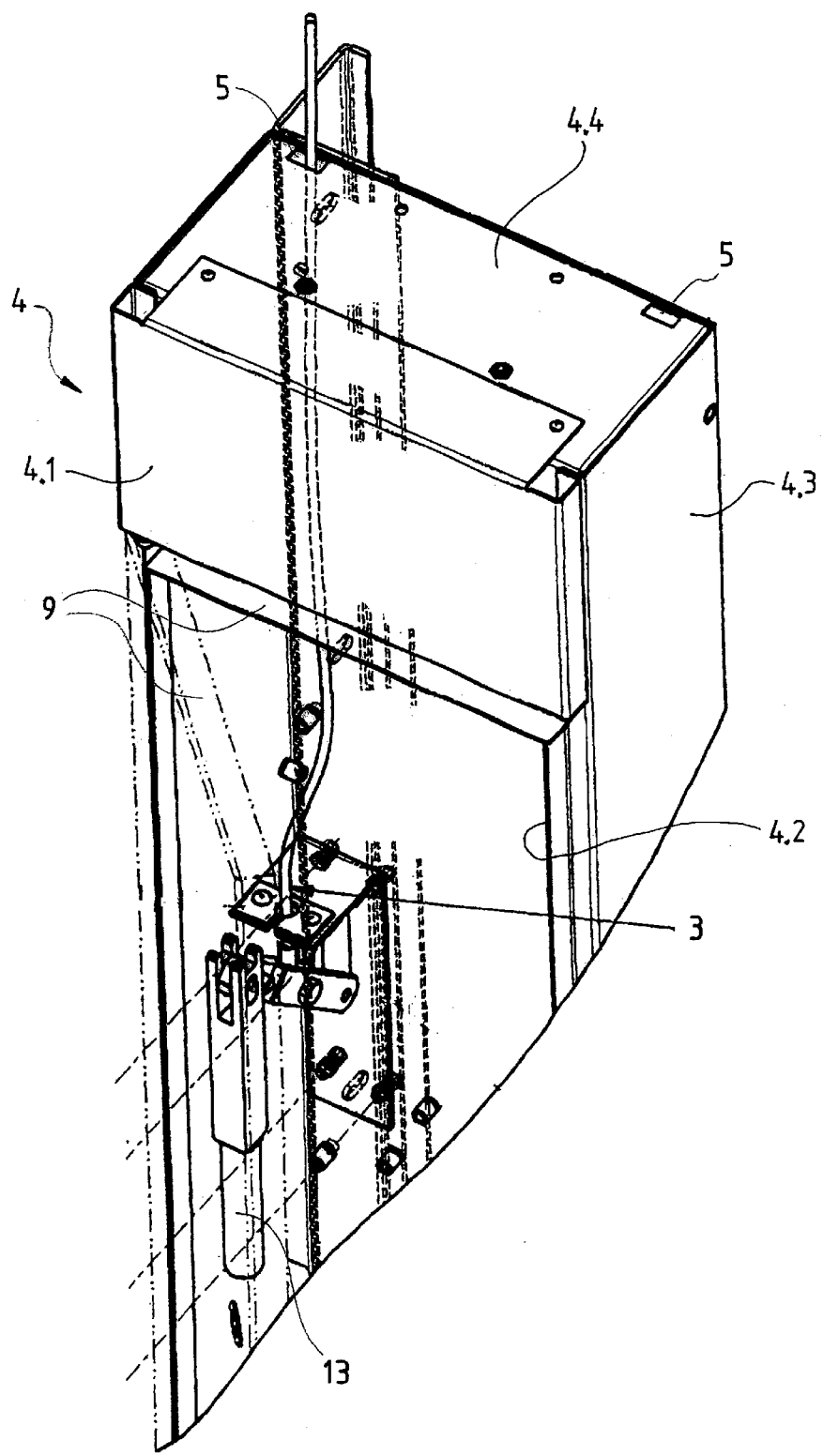
FIG. 4 is a fragmentary perspective view of the control box shown in FIG. 1 with an upper opening, through which a cable for actuation of a brake is guided.

In the FIG. 4, an upper end of the control box 4 is shown in perspective view with a pair of openings 5 formed in a top wall 4.4. After opening of the door 9 (shown in phantom) of the control box 4, a lever 13 for release of a brake is accessible. The lever 13 for release of the brake of the elevator is connected with a cable 3. The cable 3 can be, for example, a Bowden pull. The force applied in actuation of the lever 13 is transmitted by way of the cable 3 to the brake (not shown) arranged at the drive unit of the elevator in order to manually control the movement of the elevator car. The cable 3 is guided through one of the openings 5 in the top wall 4.4 of the control box 4 out into the elevator shaft 2. The other one of the openings 5 can be optional. Instead of or even in addition to the Bowden pull, an electrical cable can also be guided through one of the openings 5.

Figure 5:
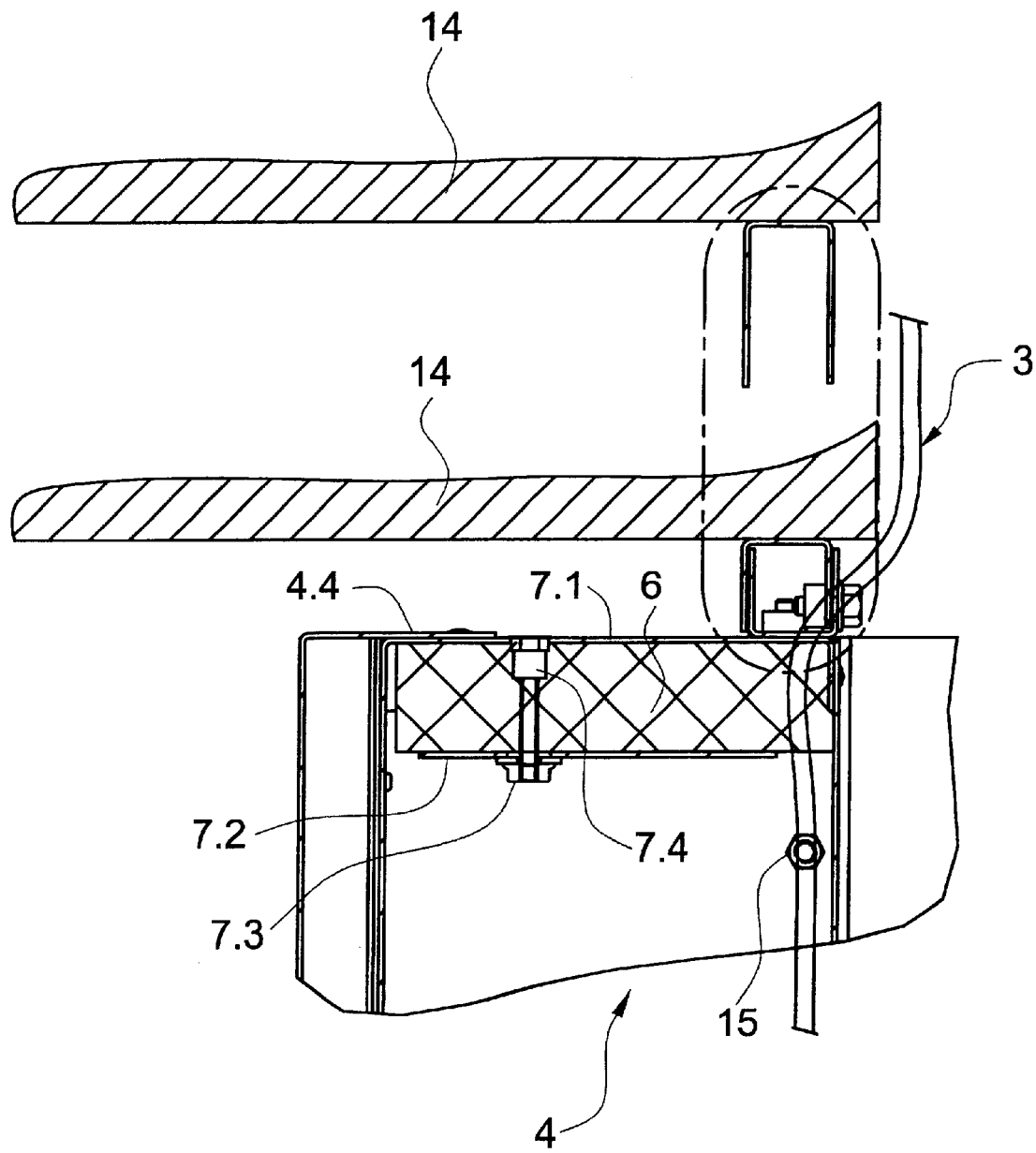
FIG. 5 is a vertical cross-section of an upper portion of the control box shown in FIG. 1 with an upper opening, through which a cable is guided.

The upper end of the control box 4 in conjunction with a cover connecting element 14 is shown in cross-section in FIG. 5. After the control box 4 has been positioned at the floor and the cable 3 guided through the opening 5 into the elevator shaft 2, the cover connecting element 14, also termed a closure panel, is inserted as shown (before and after insertion) and screw-connected with the control box 4. The cable 3 can be fixed in the control box 4 by means of a fixing element 15.

A fireproof element 6, for example a ceramic fiber mat, a rock wool mat, a glass wool mat, a mat of a silicate compound or gypsum, is installed in the upper region of the control box 4 inside the top wall 4.4 for fire isolation.

In order to keep the fireproof element 6 in its position and to lightly bias it so that it completely tightly encloses the cable 3, the fireproof element 6 can be held by means of a clamping assembly including a first clamping element 7.1, a second clamping element 7.2, and a clamping device such as a screw 7.3 and a nut 7.4. The biasing of the fireproof element 6 can be set by way of the screw 7.3. The second clamping element 7.2 can be a sheet metal strip, a sheet metal plate or the like in order to achieve a distribution, over an area, of the biasing force produced by the screw 7.3. The first clamping element 7.1 is usually a sheet metal strip that forms at least a portion of the top wall 4.4 of the control box 4. The nut 7.4 serves as a counter member for the screw 7.3.

The use of a ceramic fiber mat as the fireproof element 6 for fire protective isolation has the advantage that this does not lose its mechanical properties even under high temperature. Moreover, the ceramic fiber mat has the advantage that it can be compressed. It thereby prevents gases from passing through the opening 5 of the control box 4. Finally, the ceramic fiber mat has the advantage that it is simple to mount without the material breaking.

The size of the ceramic fiber mat depends on the size of the control box. A three centimeter thick fireproof insulation should usually be sufficient.

Figure 6:
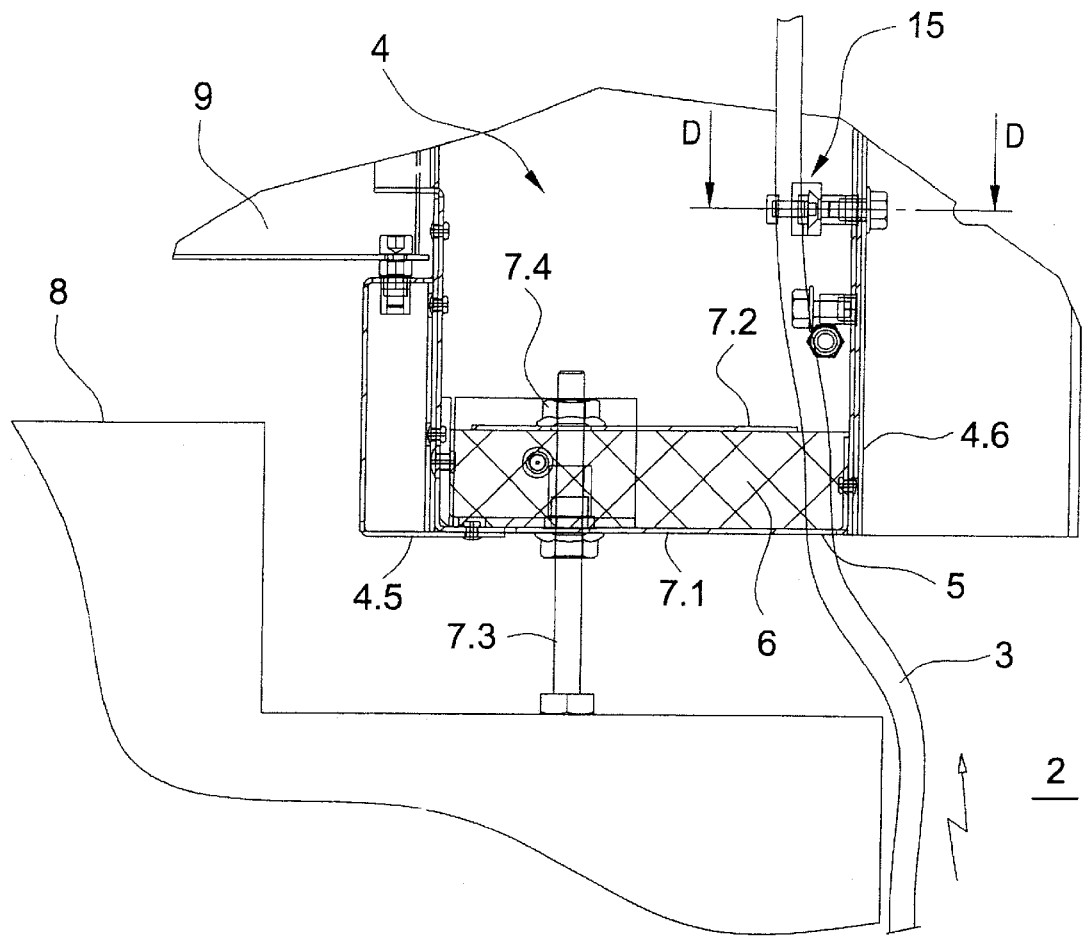
FIG. 6 is a vertical cross-section of a lower portion of the control box shown in FIG. 1 with an opening through which a cable is guided.

The opening 5 in the control box 4 for the passage of the cable 3 also can be disposed in a bottom wall 4.5 of the control box 4 (as shown in FIG. 6), as the cable passage from the control box out into the shaft 2 is more difficult to seal off in the case of an opening in a rear wall 4.6 of the control box 4.

In the embodiment shown in FIG. 6, a lower portion of the control box 4 is shown in cross-section. The control box 4 is supported by feet, which are formed by the screws 7.3, on the floor 8.

The control box 4 advantageously stands in a recess formed in the floor 8. The recess amounts to about ten centimeters so that the cable 3 can be guided underneath the control box 4 into the shaft 2. The screw 7.3 serves as a foot and additionally functions in a second clamping assembly together with the first clamping element 7.1, the second clamping element 7.2 and the nut 7.4 for compressing the fireproof element 6.

The opening 5 in the control box 4 is advantageously selected to be just sufficiently large for the cable 3 to be able to be conveniently guided through the opening.

The cable 3 is fixed in the control box 4 by the fixing element 15.

Figure 7:
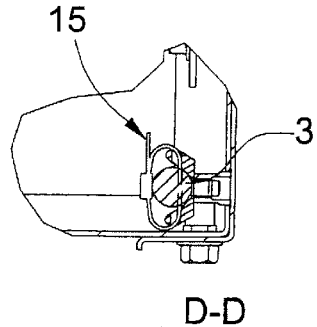
FIG. 7 is a view taken along the line D—D in FIG. 6.

A section D—D through the control box 4 in FIG. 6 is shown in FIG. 7. The fixing element 15 can be, for example, a cable tie. Additional clamping elements 7.1 and 7.2, nuts 7.4 and screws 7.3 can obviously be used for fastening and tightening the fireproof element 6.

The use of several of the screws 7.3 particularly in the lower portion of the control box 4 has the advantage that the box thereby stands on several feet and thus in a more stable manner.

Figure 8:
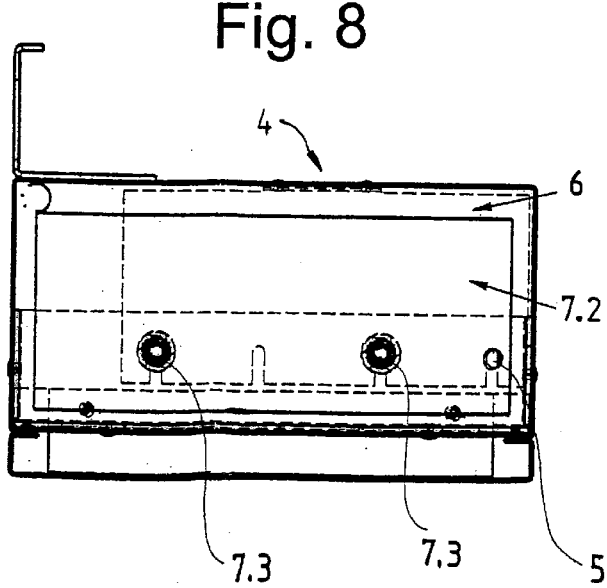
FIG. 8 is a horizontal cross-section of a bottom portion of the control box shown in FIG. 1.

The bottom portion of the control box 4 is illustrated in cross-section plan view in FIG. 8. The connecting metal plate 10, as shown in FIG. 1, is not present in the embodiment shown in FIG. 8. As is apparent from FIG. 8, it is not necessary for the fireproof element 6 to cover the entire bottom wall 4.5 of the control box 4. It merely has to be ensured that the fireproof element is sufficiently present in the region of the opening 5 to surround the cable 3 which is passed through the opening.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A control box for an elevator for mounting in a wall of an elevator shaft comprising:
    a hollow box having a wall with an opening formed therein;
    a cable extending through said opening in said wall;
    a fireproof element mounted in said box surrounding said cable in a region of said opening to prevent smoke or flames inside said box from exiting through said opening; and
    a clamping means including a pair of generally planar clamping elements movable relative to one another and a clamping device and wherein said fireproof element is clamped in place between said clamping elements by said clamping device extending through said fireproof element and drawing said clamping elements toward one another.

2. The control box according to claim 1 having a lower portion including said wall.

3. The control box according to claim 1 wherein said fireproof element is formed of one of a ceramic fiber, a rock wool, a glass wool, a silicate compound and a gypsum material.

4. The control box according to claim 1 wherein said cable is tightly surrounded by said fireproof element.

5. The control box according to claim 1 wherein said clamping device includes a screw and a cooperating nut.

6. The control box according to claim 5 wherein said screw functions as a foot to support said box on a surface.

7. The control box according to claim 1 wherein said box is adapted to stand in a recess formed in a floor adjacent an elevator shaft.

8. The control box according to claim 1 wherein said cable is one of an electrical cable and a cable for actuation of a brake.

9. The control box according to claim 1 having an upper portion including said wall.

10. The control box according to claim 1 wherein a portion of said wall forms one of said clamping elements.

11. A control box for an elevator for mounting in a wall of an elevator shaft comprising:
    a hollow box having a wall with an opening formed therein;

a cable extending through said opening in said wall;

a fireproof element mounted in said box surrounding said cable in a region of said opening to prevent smoke or flames inside said box from exiting through said opening; and a pair of clamping elements and a clamping device, one of said clamping elements being movable relative to another of said clamping elements and said fireproof element being clamped in place between said clamping elements by said clamping device drawing said clamping elements toward one another.

12. The control box according to claim 11 wherein said fireproof element is formed of one of a ceramic fiber, a rock wool, a glass wool, a silicate compound and a gypsum material.

13. The control box according to claim 11 wherein said cable is tightly surrounded by said fireproof element.

14. The control box according to claim 11 wherein said clamping device includes a screw and a cooperating nut.

15. The control box according to claim 14 wherein said screw functions as a foot to support said box on a surface.

16. The control box according to claim 11 wherein said box is adapted to stand in a recess formed in a floor adjacent an elevator shaft.

17. The control box according to claim 11 wherein said cable is one of an electrical cable and a cable for actuation of a brake.

18. The control box according to claim 11 having an upper portion including said wall.

19. The control box according to claim 11 having a lower portion including said wall.

20. The control box according to claim 11 wherein a portion of said wall forms one of said clamping elements.

* * * * *